US007072344B2

(12) United States Patent
Abdelilah et al.

(10) Patent No.: US 7,072,344 B2
(45) Date of Patent: Jul. 4, 2006

(54) REDISTRIBUTION OF EXCESS BANDWIDTH IN NETWORKS FOR OPTIMIZED PERFORMANCE OF VOICE AND DATA SESSIONS: METHODS, SYSTEMS AND PROGRAM PRODUCTS

(75) Inventors: Youssef Abdelilah, Holly Springs, NC (US); Gordon Taylor Davis, Chapel Hill, NC (US); Jeffrey Haskell Derby, Chapel Hill, NC (US); Dongming Hwang, Cary, NC (US); Clark Debs Jeffries, Durham, NC (US); Malcolm Scott Ware, Raleigh, NC (US); Hua Ye, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 942 days.

(21) Appl. No.: 09/906,485

(22) Filed: Jul. 16, 2001

(65) Prior Publication Data
US 2004/0213257 A1  Oct. 28, 2004

(51) Int. Cl.
*H04L 12/56* (2006.01)
(52) U.S. Cl. .................. 370/395.21; 370/231; 370/235
(58) Field of Classification Search ................ 370/229, 370/231–234, 235, 236, 395.21, 395.41–395.43
See application file for complete search history.

(56) References Cited

U.S. PATENT DOCUMENTS

| | | | |
|---|---|---|---|
| 4,503,533 A | 3/1985 | Tobagi et al. ................... 370/85 |
| 5,115,430 A | 5/1992 | Hahne et al. ............... 370/85.6 |
| 5,692,126 A | 11/1997 | Templeton et al. ..... 395/200.02 |
| 5,784,569 A | 7/1998 | Miller et al. ........... 395/200.65 |
| 6,097,733 A * | 8/2000 | Basu et al. .................. 370/468 |
| 6,377,955 B1 * | 4/2002 | Hartmann et al. ......... 707/104.1 |
| 6,456,714 B1 * | 9/2002 | Shima et al. ........... 379/399.01 |
| 2004/0090983 A1 * | 5/2004 | Gehring et al. .............. 370/458 |

FOREIGN PATENT DOCUMENTS

| | | |
|---|---|---|
| EP | 0258514 A1 | 3/1988 |
| EP | 0478190 A2 | 4/1992 |
| EP | 0859492 A2 | 8/1998 |

(Continued)

OTHER PUBLICATIONS

ITU-T Recommendation H.323:Packet-Based Multimedia Communications Systems.*

(Continued)

*Primary Examiner*—Chi Pham
*Assistant Examiner*—Thai Hoang
(74) *Attorney, Agent, or Firm*—Joscelyn G. Cockburn; Joseph C. Redmond, Jr.

(57) ABSTRACT

A packet network redistributes excess bandwidth for voice and data sessions applying a Quality of Service (QoS) algorithm. The network includes interacting client stations using H.323 protocol managing bit rate according to an algorithm as voice and data sessions are added or removed from the network. The client stations include codecs coupled to the network. The codecs provide voice sessions at a minimum bandwidth using a voice codec bit rate and preferred bandwidth using another voice codec bit rate. A first algorithm applies the QoS algorithm allocating bandwidth between interacting client stations after the addition of a new voice or data session when there is insufficient bandwidth for the new session to receive preferred bandwidth. A second algorithm is applied when a voice or data session is removed from the interacting client stations. If any session is allocated minimum bandwidth the QoS increases a voice session at minimum bandwidth to preferred bandwidth if excess bandwidth is available.

31 Claims, 3 Drawing Sheets

FOREIGN PATENT DOCUMENTS

| WO | 92/21185 | 11/1992 |
|---|---|---|
| WO | 98/27747 | 6/1998 |

OTHER PUBLICATIONS

Nuggehally S. Jayant P. Noll, *"Digital Coding of Waveforms: Principles and Applications to Speech and Video"*, Prentice Hall, Englewood Cliffs, New Jersey, pp. 543-552, Nov. 1984.

Yin, N.; Hluchyj, M.G.; *"A dynamic rate control mechanism for integrated networks"*, INFOCOM '91. Proceedings; Tenth Annual Joint Conference of the IEEE Computer and Communications Societies; Networking in the 90s; IEEE, 1991; pp. 543-552 vol. 2. Apr. 7-11, 1991.

http://www.icng.com/warp/public/cc/pd/as/as5300/prodlit/vffc_ds.html, Data Sheet, Cisco AS5300/Voice Gateway, pp. 1-16, Sep. 5, 2000.

"Internet Architectures" by D. Minoli and A. Schmidt, published by John Wiley & Sons, New York, New York, pp. 37-56, (ISBN 0-471-19081-0) 1998.

U.S. Appl. No. 09/448,190 entitled "Method and System for Providing Optimal Discard Fraction", filed Nov. 23, 1999.

U.S. Appl. No. 09/448,197 entitled "Method and System for Providing Differentiated Services in Computer Networks", filed Nov. 23, 1999.

U.S. Appl. No. 09/906,406 entitled "Codec With Network Congestion Detection An Automatic Fallback: Methods, Systems and Program Products", filed Jul. 16, 2001.

U.S. Appl. No. 09/906,499 entitled "Controlling Network Congestion Using a Biased Discard Policy: Methods, Systems and Program Products", filed Jul. 21, 2001.

* cited by examiner

REDISTRIBUTION OF EXCESS BANDWIDTH IN NETWORKS FOR OPTIMIZED PERFORMANCE OF VOICE AND DATA SESSIONS: METHODS, SYSTEMS AND PROGRAM PRODUCTS

RELATED APPLICATIONS (1) Ser. No. 09/448,190 entitled "METHOD AND SYSTEM FOR PROVIDING OPTIMAL DISCARD FRACTION", filed Nov. 23, 1999 (RAL919990136US1); issued as U.S. Pat. No. 6,724,776 on Apr, 20, 2004.

(2) Ser. No. 09/448,197 entitled "Method and System for Providing Differentiated Services in Computer Networks", filed Nov. 23, 1999 (RAL919990138US1), issued as U.S. Pat. No. 6,657,960 on Dec. 2, 2003 both applications assigned to the same Assignee as that of the present invention and fully incorporated herein by reference.

(3) Copending application Ser. No. 09/906,406 entitled "Codec With Network Congestion Detection And Automatic Fallback: Methods, Systems and Program Products", filed Jul. 16, 2001 (RAL920000088US1/1963-7412), published as U.S. application publication No. US2003-0012138A1 on Jan. 16, 2003; and (4) Copending application Ser. No. 09/906,499 entitled "Controlling Network Congestion Using A Biased Packet Discard Policy for Congestion Control and Encoded Session Packets: Methods, Systems and Program Products", filed Jul. 16, 2001 (RAL9-2000-0089US1/1963-7413) published as U.S. application publication No. US2003-0012137A1 on Jan. 16, 2003, both applications assigned to the same assignee as that of the present invention and fully incorporated herein by reference.

BACKGROUND OF INVENTION

1. Field of Invention

This invention relates to communication network bandwidth allocation methods, systems and program products. More particularly, this invention relates to redistribution of excess bandwidth in networks for optimized performance of voice and data sessions: methods, systems and program products 2. Description of Prior Art Numerous different Speech Coder/Decoder techniques for compressing speech signals and recovering the original signals from the compressed data have been standardized by the ITU-T (e.g., G.711, G.723.1, G.726, G.728, G.729 A). There are many other codec techniques, which remain proprietary. The various codec algorithms typically provide a trade-off between implementation complexity (MIPs and Memory) bit rate required to support real-time speech, and speech quality. Thus one can typically choose a more complex algorithm to reduce the bit rate required to support a voice session, but in general the lower bit rate also typically results in lower quality speech when passed through a coder/decoder pair.

Speech coders are typically useful in facilitating voice traffic within packet-based networks i.e., IP networks, including the Internet as well as private and virtual private networks. The speech compression function is desirable since it reduces the load on the networks by reducing the bit rate required to support each speech session. Motivation for voice over packet networks is to reduce the cost of voice traffic i.e., toll bypass, as well as to consolidate both voice and data onto a single network thereby reducing network management overhead. Another motivation of voice over packet technology is to connect a remote telephone into the public telephone network without using local phone service. The connection is done by using a broadband link such as Asynchronous Digital Subscriber Line (ASDL) to carry the digitized voice from the subscriber's location through the local central office to a voice gateway In either network configuration, the voice codec type is typically negotiated at the beginning of a voice session. ITU-T standard H.323 provides a protocol for two endpoints to negotiate the desired speech coder for a session. Once established, speech codec parameters are typically fixed for the duration of a phone call. Typical user preference would be to always use the codec which results in the best speech quality. Unfortunately, if there is significant traffic (many voice sessions as well as many data sessions) on the network, the higher throughput required for the desired speech quality can result in lost packets for both voice and data traffic in the network due to network router decisions to discard packets as queues become too full. Lost voice packets degrade the speech quality of voice sessions, and lost data traffic may even make congestion worse because of a need to retransmit discarded data. The desirability of adjusting speech coder bit-rate in response to congestion was pointed out in the text "Digital Coding of Waveforms" by Jayant and Noll, published by Prentice Hall, Englewood Cliffs, New Jersey, November 1984. However there was no discussion in this reference as to how one should determine when to alter the coder bit rate. A paper entitled "A dynamic rate control mechanism for integrated networks", by Yin and Hluchyj, Proceedings—IEEE Infocom, 1991, (Location) discloses a technique whereby a network device could modify a packet header to indicate to the end nodes a congested network condition. However, the technique requires explicit packet modification within the network and would be difficult to implement on a widespread basis.

Another motivation for voice over packet networks is that the network transmits data for each session fairly. One method of enforcing fairness is a Quality of Service (QoS) algorithm, which allocates each session with its subscribed bandwidth and then evenly distributes excess bandwidth to all established sessions. See the Related Applications, supra. However, when a network carries more than data (e.g. data and voice), the bandwidth allocation becomes critical to the performance of the network. For example, either a certain amount of bandwidth is needed for a voice session to achieve higher bit rate or the bandwidth will be wasted because of the characteristics of the voice specifications. Thus1 there is a need to apply an appropriate Quality of Service (QoS) algorithm to optimize the usage of the network bandwidth and increase the performance of each speech and data session.

Prior art related to bandwidth allocation in packet networks includes:

(1) U.S. Pat. No. 5,784,569 entitled "Guaranteed Bandwidth Allocation Method In A Computer System For Input/Output Data Transfers" issued Jul. 21, 1998, filed Sep. 23, 1996 discloses an arbitration procedure for selecting among devices in a Computer system requesting access to a single resource such as, for example, a system bus or main memory. The arbitration procedure provides an efficient means for guaranteeing the available system bus bandwidth to devices having high bandwidth requirements. Each device can be allotted a certain amount of bandwidth that is guaranteed to be available for that device within a given time interval. Excess bandwidth not consumed by the guaranteed allotments can be used as remainder (e.g., available but not guaranteed) bandwidth by the devices. The arbitration procedure further provides a guaranteed maximum latency so that no device is prevented from completing data transfers in a timely manner. The arbitration procedure still further provides the ability to dynamically program the amount of the bandwidth that is guaranteed a particular device. The arbitration procedure can be applied to a number of different communication platforms and bus protocols.

(2) International Publication WO98/27747 entitled "Medium Access Control (MAC) Protocol for Wireless ATM"; published Jun. 25, 1998 discloses a protocol, method, and apparatus for managing network communications particularly well suited for ATM communications across a wireless medium. Contiguous time slots within a frame are allocated to each node having traffic to send. Each node is assured a nominal bandwidth, and excess bandwidth is distributed by demand. The allocation of excess bandwidth can be dependent upon the size of the buffer at each node, as well as the time-criticality of each message. Nodes communicate their requests for allocation by appending such control information to the first of their transmitted packets. The allocation, of each node's transmit and receive time slots, is transmitted to all the nodes at the beginning of each frame. Thereafter, each node need not participate on the network until their allocated time periods, thereby allowing portable devices to enter inactive states to conserve power. The network is operated in a connection mode; connections are established in a relatively non-interfering manner by the use of periodically occurring beacons. Inactive, unconnected, nodes need only monitor the network during these beacon periods, further allowing for power conservation.

(3) EPO 0859492A2 entitled "Fair Queuing System with Adaptive Bandwidth Redistribution", issued Aug. 19, 1998 discloses apparatus for routing packets in a communication network including a plurality of per-connection queues, each queue established for receiving packets from a respective source and temporarily storing each received packet before routing to a particular destination; a weighted fair-queuing scheduler for servicing packets from each of the plurality of per-connection queues at guaranteed pre-allocated rates; a sensing device for a presence or absence of packets in queues, the absence of packets in queues indicating availability of excess bandwidth; and a state dependent scheduler for redistributing excess bandwidth upon sensing empty queues, the state dependent scheduler servicing those queues in accordance with a state variable corresponding to performance property of the queues wherein delay and isolation properties for routing packets of respective queues in weighted fair-queuing is preserved.

(4) EPO 02/58514 A1 entitled "Optimized Bandwidth Allocation Apparatus Between Circuit Slots and Packet Bit Stream in a Communication Network", issued Mar. 9, 1988 discloses an integrated packet/circuit switched telecommunications network, instantaneously on a per-slot basis reallocating to the background packet flow, the momentarily unused bandwidth let by a circuit user source and give it back to the circuit source as it resumes its activity. The circuit user data are sent through the network during slots of frames, which are assigned to the circuit users on the call basis. Interfacing means are provided to generate slot-qualifying bits, which are set to a first value when the corresponding circuit users are active and to a second value when the corresponding circuit users are inactive. The qualifying bits are transported through the network in correspondence with the slot they qualify, and sensed to cause the slots having qualifying bits set to the second value to be filled with packet bits.

None of the prior art discloses a method of applying QoS algorithm for bandwidth allocation to achieve higher performance in the network and guarantee each session with the minimum required bandwidth when a session (voice or data) is added at login or removed at logoff thereby enabling voices sessions to optimize speech quality by using the excess bandwidth when available.

SUMMARY OF INVENTION

An object of the invention is an improved packet network method, system and program product, which redistributes excess bandwidth to optimize the performance of voice and data sessions.

Another object is an improved packet network method, system and program which allocates a new voice session in the network based on a voice codec using a QoS bandwidth allocation algorithm.

Another object is an improved packet network method, system and program product which allocates bandwidth to remaining voice sessions based on a voice codec using a QoS algorithm when a voice or data session is added or removed from network.

These and other objects, features and advantages are achieved in Voice Over IP (VoIP) network or other packet network which redistributes excess bandwidth for voice and data sessions applying a Quality of Service (QoS) algorithm. The network includes interacting client stations using H.323 protocol managing bit rate according to an algorithm as voice and data sessions are added or removed from the network. The client stations include codecs coupled to the network via Internet Service Providers (ISP) or Digital Subscriber Line Access Multiplexers (DSLAM). The codecs provide voice sessions at a minimum bandwidth using a voice codec (e.g., G.723) and preferred bandwidth using another voice codec (e.g., G.729). Alternatively, a single codec type supporting 2 or more bit rates may be used. A first algorithm applies the QoS algorithm allocating bandwidth between interacting client stations after the addition of a new voice or data session when there is insufficient bandwidth for the new session to receive preferred bandwidth. A second algorithm is applied when a voice or data session is removed from the interacting client stations. If any session is allocated minimum bandwidth the QoS increases a voice session at minimum bandwidth to preferred bandwidth.

DESCRIPTION OF THE DRAWINGS

The invention will be further understood from the following detailed description of a preferred embodiment taken in conjunction with an appended drawing, in which.

DESCRIPTION OF PREFERRED EMBODIMENT

Figure 1:
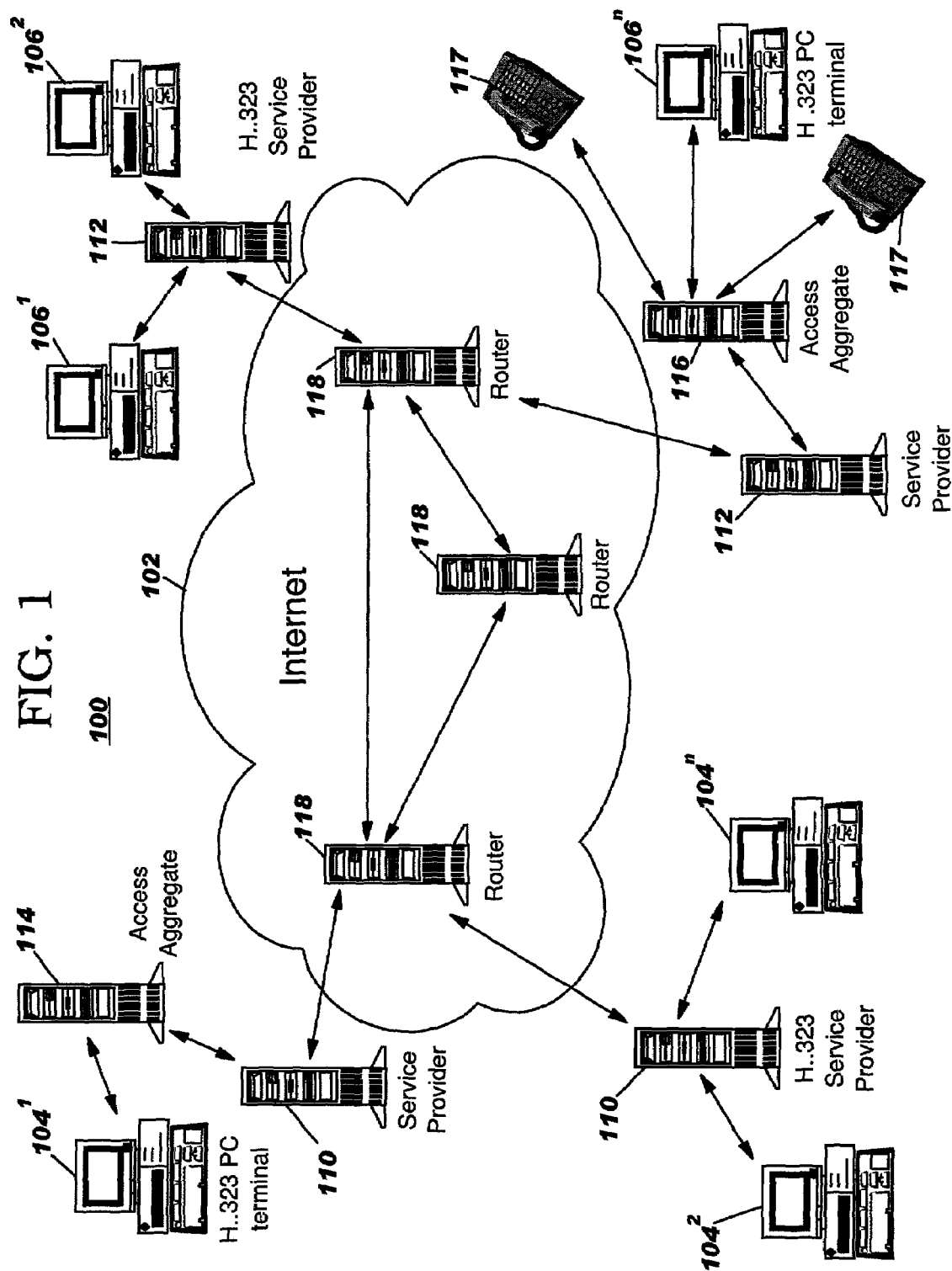
FIG. 1 is a representation of an IP packet network, typically the Internet or private packet network or virtual private network for voice and data transmission between two or more client stations executing software applications. These client stations include voice codecs allocating bandwidth to achieve higher performance in the network by guaranteeing each session with the minimum required bandwidth when a session (voice or data) is added at login or removed at logoff thereby enabling voices sessions to optimize speech quality by using the excess bandwidth when available.

In FIG. 1 a network 100 includes terminals $104^1$, $104^2$, $104^n$ and $106^1$, $106^2$ and $106^n$ with voice codecs allocating bandwidth to achieve higher performance in the network by guaranteeing each session with the minimum required bandwidth when a session (voice or data) is added at login or removed at logoff thereby enabling voices sessions to optimize speech quality by using the excess bandwidth when available. The terminals are connected to the Internet 102 via Internet Service Providers (ISP) 110 and 112, respectively. Alternatively, the terminals may be connected to the network 102 by access aggregating terminals 114, 116 linked to the service providers or Digital Subscriber Line Access Multiplexer (DSLAMs) (not shown).

The terminals 114 and 116 may also be connected to voice/data terminals 117. The service providers are in turn linked to routers 118 within the network 102 for directing the calls and data between the terminals 104 and 106. The operation of the Internet for initiating and routing calls between terminals is well known and described, for example, in the text "Internet Architectures" by D. Minoli and A. Schmidt, published by John Wiley & Sons, New York, New York, 1998 (ISBN 0-471-19081-0) which is fully incorporated herein by reference.

Terminals 104, 106 and the service providers 110, 112 function according to the framework of International Telecommunications Union (ITU) H.323 Standard for audio, video and data communications across IP networks including the internet. H.323 allows multi-media products and applications from multiple vendors to inter-operate without concern for computability. H.323 covers a selection of audio and video codecs, shared applications, call control, and system control. H.323 includes ITU H.245 which is used to negotiate capabilities under control aspects of the conference between two or more points.

The terminals include speech coder/decoder techniques for compressing speech signals and recovering the original signals from compressed data. The speech compression and decompression techniques have been standardized by the ITU, e.g., G.711, G.723.1, G.726, G.728, G.729A.

A speech or data session is set up between two terminals, e.g., 104, 106, executing compression/decompression algorithms, e.g., G.711, as voice codecs. The codecs packetize the speech which is transmitted over the internet using the "UDP" format. Each of the codecs must be configured in accordance with a previously negotiated Service Level Agreement (SLA) with the operator of the network. The SLA defines, among other things, a preferred speech codec type and a guaranteed minimum bit rate (minimum speech quality) speech codec type.

The terminals and the service providers 110, 112 execute software implementing the H.323 protocol which manages call signaling for two or more end points engaged in a speech session. The H.323 protocol defines procedures for two voice codec devices to negotiate a commonly-agreed to speech codec type and bit rate.

In the absence of significant network congestion, the voice codecs select the speech codec type with the highest speech quality (typically also the highest bit rate, but lowest implementation complexity) from among the set of speech codec types which can be commonly supported between the two devices. At least two different codec types or two different bit rate modes within the same codec type must be commonly supported between the two codec devices. It is preferable to select multiple bit rates within the same codec type in order to minimize the transient effects of switching from one bit rate to another. A particular response time advantage for switching rates can be achieved if the codec type includes an embedded bit stream with predetermined priorities associated with different groups of bits within a packet. When using such a codes type, a lower bit rate may be achieved without negotiating with the other end by simply dropping the lower priority bits in the encoding process, thus creating a smaller packet to send during each interval. The receiving decoder will automatically recognize that the received packet has less than the expected amount of data and since the priorities of the group of bits are predetermined, the decoder knows which bits were not sent, and knows how to recreate a lower quality speech signal with the bits received without having to negotiate the lower bit rate. The receiving decoder may optionally signal its end coder to reduce the bit rate in the opposite direction by the same amount in order to better deal with the network congestion which was originally detected in that direction.

Once the connection is established between terminals 104, 106 and compressed voice packets start flowing in the "UDT" format, H.323 control software typically becomes a background process, available for renegotiations or session termination but not actively processing the speech packets.

Alternatively, a network node can also stimulate end points to rapidly reduce codec bit rate by discarding both voice and congestion control packets, and still explicitly delay restoring the flow of congestion control packets once speech packets are flowing again to ensure speech coders do not attempt to speed up to soon causing a reoccurrence of the network congestion.

As packet networks become more congested and more integrated there is a need to support QoS in networks as a means of providing a guaranteed level of service such that customer end-to-end latency will not exceed a specified level. A description of QoS requirements in packet networks is described in the text "Internet Architectures", supra. However, any bandwidth allocation in networks supporting QoS must be fairly applied across the network. An example of an algorithm for bandwidth allocation is described in RAL919990138, supra which discloses controlling a plurality of pipes in a computer network. The network includes at least one processsor for a switch. The processor has a queue and the plurality of pipes utilize the queue for transmitting traffic through the switch. A minimum and maximum flow is set for each of the pipes. The computer determines if excess bandwidth exists for the queue. The flow in a pipe is linearly increased based on the minimum flow or the maximum flow if excess bandwidth exists and if the flow for the plurality of pipes is less than the maximum flow for the pipe. The flow of a pipe is exponentially decreased based on the minimum flow or the maximum if excess bandwidth does not exist and the flow is greater than the minimum flow for the pipe thereby stabilizing the traffic through the switch.

The particular QoS algorithm described above was selected as an example of QoS bandwidth allocation algorithm applicable in the invention. It should be understood that any QoS bandwidth allocation algorithm could be used in practicing the invention.

Management of bandwidth allocation becomes more complex when the network supports both voice and data sessions. Processes are needed to achieve higher network performance. Such processes should guarantee each session with minimum required bandwidth when a voice or data session is added or removed and enable voice sessions to optimize speech quality by using excess bandwidth when available.

Figure 2:
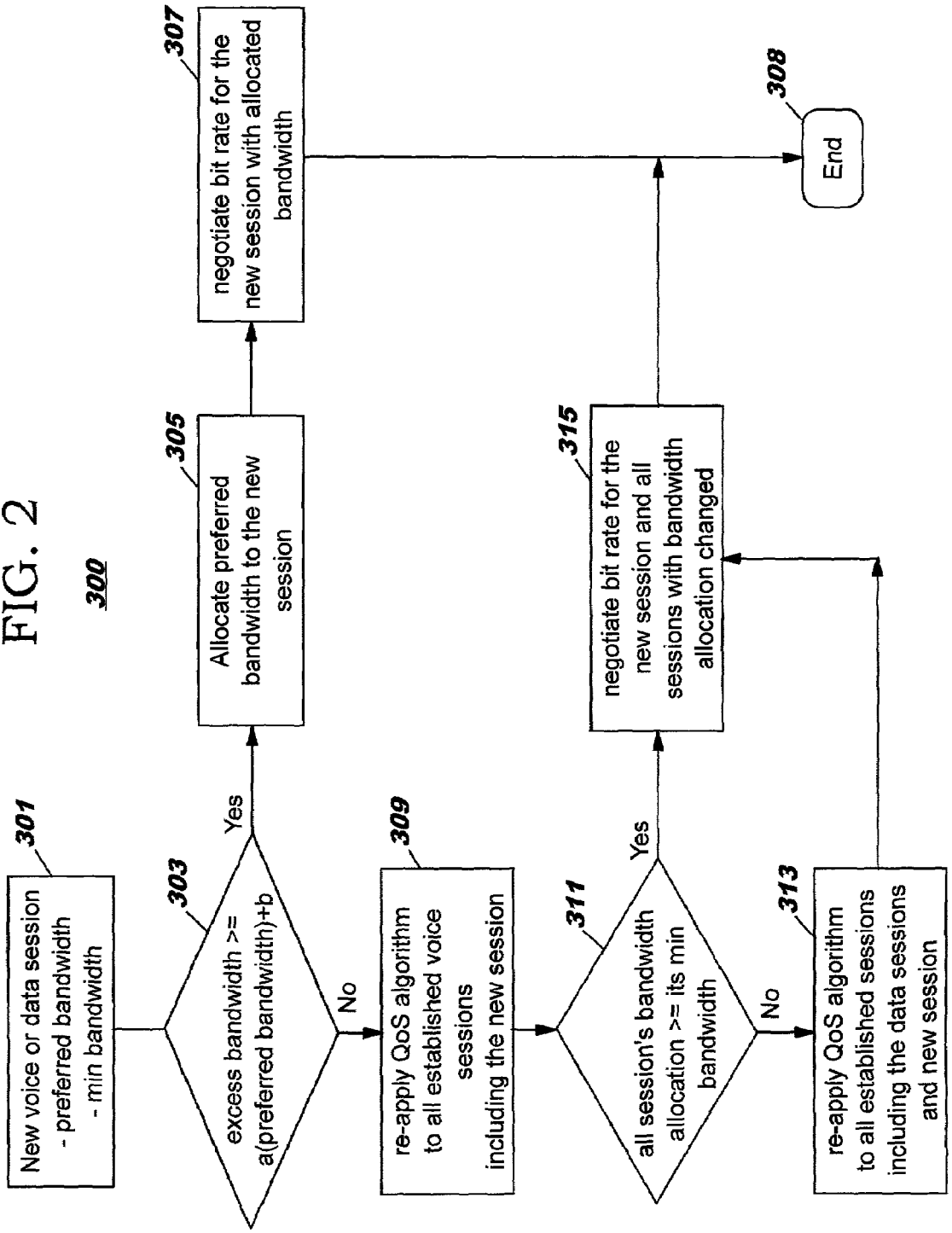
FIG. 2 is a flow diagram of a first algorithm for redistributing excess bandwidth when a voice or data session is added in the network of FIG. 1.

FIG. 2 describes a process 300 for achieving higher network performance when a new voice or data session is added to the network. The process 300 may be executed in the access aggregate terminals 114 or 116 for one end of the connection. In block 301, a new voice or data session is to be added. For example, a voice session may function at a minimum bandwidth using a voice codec, e.g., G.723, and a preferred bandwidth using another voice codec, e.g., G.729.

In block 303, a determination is made whether the excess bandwidth available at the time the session is added is greater than or equal to (a) * (preferred bandwidth)+(b) where the value of constants "a" and "b" are bandwidth margin safeguards. Constants "a" & "b" simply insure that a single pending session does not consume the entire available "excess bandwidth". For example if a =2, and b =0, then excess bandwidth must be at least double the preferred bandwidth in order to allocate the session at the preferred bandwidth. Constant "b" can add additional buffer on excess bandwidth that is not proportional to the preferred bandwidth, again insuring that there will be some bandwidth left available after the pending session is started. Values of constants "a" & "b" are set by a network administrator, and specific values can vary widely depending on such things as total number of sessions, rate of new sessions, length of sessions, quality of service objectives for network, etc. In a "yes" condition the process will allocate preferred bandwidth to the new sessions in block 305. The interacting codecs negotiate the bit rate for the new session with the allocated bandwidth in block 307 using the H.323 protocol, after which the process ends and waits for the next voice or data session to be added to the network.

A "no" condition for block 303 where the bandwidth is not greater than or equal to (a)*(preferred bandwidth)+(b), the client's station applies an agreed upon QoS algorithm for the network to all established voice sessions including the new session in block 309.

All session's bandwidth allocations are checked in blocked 311 to determine whether they are greater than or equal to their minimum bandwidth.

A "no" condition reapplies the QoS algorithm to all established sessions including the data sessions and new voice or data sessions in block 313 and all session bandwidth is less is than the minimum bandwidth, after which the process transfers to block 315 where the voice and data sessions renegotiate bit rate for the new session and all sessions with bandwidth allocation changed.

If all sessions are at or above their minimum bandwidth at block 311, the process transfers to 315 where the client stations negotiate the bit rate for the new sessions and renegotiate all bit rates for established sessions with the bandwidth allocations changed by 309 or 313 after which the process returns to block 308 where the process ends.

Figure 3:
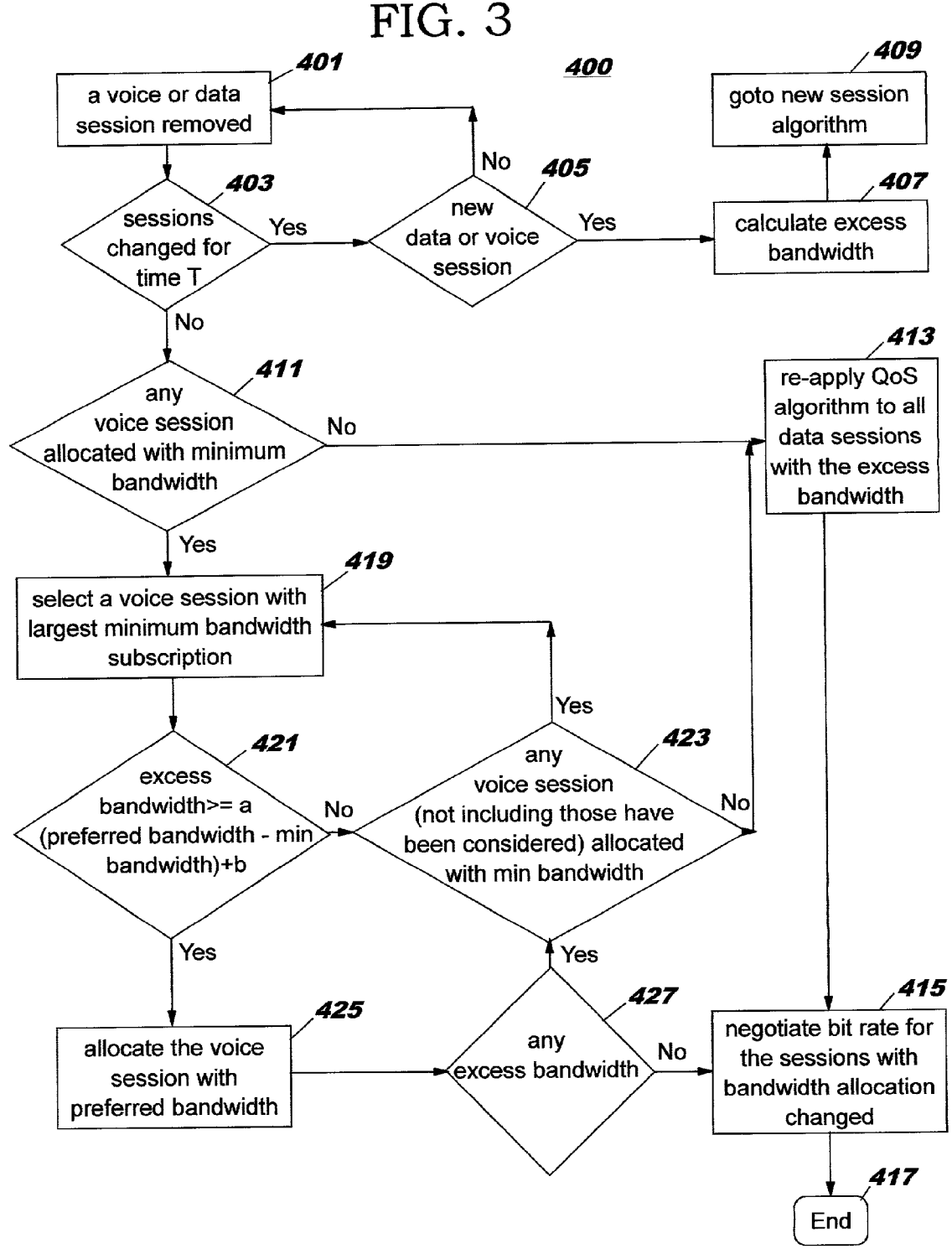
FIG. 3 is a flow diagram of a second algorithm for redistributing excess bandwidth when a voice or data session is removed in the network of FIG. 1.

FIG. 3 describes a process 400 for higher network performance when a voice or data session is removed from interacting client stations on the network. The process 400 may be executed in the access aggregate terminals 114 or 116 (See FIG. 1) for one end of the connection.

FIG. 3 describes a process 400 for higher network performance when a voice or data session is removed from interacting client stations on the network. The process 400 may be executed in the access aggregate terminals 114 or 116 for one end of the connection.

When the network detects a voice or data session has been removed in block 401, a test is performed in block 403 to determine whether any other session changed, added or removed, occurred within a selected time period (T).

The "yes" condition initiates block 405 in which a determination is made whether a new session has been setup. If not, the process returns to block 401.

The excess bandwidth is calculated in block 407 and the process transfers to adding the new session in block 409 which is described in FIG. 3.

If block 403 is a "no" condition, a test is performed in block 411 to determine whether any voice session is allocated with minimum bandwidth.

A "no" condition transfers the process to block 413 which reapplies the QoS algorithm to all data sessions including the excess bandwidth, after which the bit rate for those sessions with bandwidth allocation change is renegotiated in block 415 and the process ends in block 417 waiting for the next voice or data session to be removed.

If block 411 is a "yes" condition, block 419 identifies the voice session with the largest minimum bandwidth subscription. Those voice sessions are identified in block 421 where the excess bandwidth is greater than or equal to (a)(preferred bandwidth −minimum bandwidth)+(b).

If a "no" condition exists, block 423 determines whether any voice sessions, not including those having been previously considered, is allocated with the minimum bandwidth.

If "yes" the process returns to block 419. If "no" the process transfers to 413 to reapply the QoS algorithm to all data sessions with excess bandwidth and the bit rates are negotiated where the bandwidth allocation is changed in block 415.

If block 421 is a "yes" condition, block 425 increases a voice session currently at minimum bandwidth to preferred bandwidth after which a test is performed in block 427 to determine whether or not any excess bandwidth remains.

A "yes" condition returns the process to block 423 and a "no" condition returns the process to block 415. The process continues until all excess bandwidth has been allocated or until all sessions have been allocated their preferred bit rate. The process ends in block 417 waiting for the next voice or data session to be removed.

While the invention has been described in a preferred embodiment various changes, such as multiple bit rate choices (i.e., more than 2), may be made without departing from the spirit and scope of the invention as defined in the appended claims, in which,

We claim:

1. A packet network redistributing excess bandwidth for optimized performance of voice and data sessions conducted on the network, comprising:
   plurality of client stations connected to the network for conducting voice and data sessions;
   each client station including at least one codec for conducting sessions at a selected minimum bandwidth or a preferred bandwidth; and
   a Quality of Service (QoS) application executing in the client stations and controlling the redistribution of bandwidth when a Previously Presented session is set up or an existing session is removed, so that every Previously Presented session will have at least minimum bandwidth or, reallocating bandwidth to remaining sessions after a removal of a session to increase bandwidth for some sessions.

2. The network of claim 1 further comprising:
   session managing apparatus managing bit rate negotiations between client stations conducting voice and/or data sessions after addition or removal of voice or data session.

3. The network of claim 1 further comprises:
an application in the client station executing a protocol for minimum bandwidth allocation.

4. The network of claim 1 further comprises:
an application in the client station executing a protocol for preferred bandwidth allocation.

5. The network of claim 1 further comprises:
an application in the session managing apparatus executing a protocol for bit rate negotiation.

6. The network of claim 5 wherein the protocol for bit rate negotiations is ITU-T H.323.

7. The network of claim 1 further comprises:
timing apparatus which determines whether a session removal has occurred within a time period (T).

8. The network of claim 1 further comprises:
excess bandwidth detection apparatus and apparatus for reallocating bandwidth when an existing voice or data session is removed based on ensuring that some excess bandwidth remains after a pending session is started.

9. A method of redistributing excess bandwidth in a packet network upon the addition of a session, comprising:
executing in a client station the steps of determining whether a session is being added to the network;
determining if the session is at a preferred bandwidth;
allocating preferred bandwidth to a Previously Presented session if excess bandwidth is available;
negotiating bit rate for the Previously Presented session with the allocated bit bandwidth;
Applying a Quality of Service (QoS) algorithm to all established voice sessions including the Previously Presented session if excess bandwidth is not available; and
determining if all session bandwidth allocations are equal to or greater than their minimum bandwidth upon addition of a session.

10. The method of claim 9 further comprising the step of:
applying the Quality of Service (QoS) algorithm to all established sessions including data sessions if all session bandwidths are not at their minimum bandwidth.

11. The method of claim 9 further comprising the step of:
negotiating the bit rate for the Previously Presented session and all established sessions with the bandwidth allocation changed.

12. The method of claim 9 further comprising the step of: executing an ITU-T protocol for bit rate negotiation.

13. A method for redistributing excess bandwidth in a packet network upon removal of a voice or data session, comprising the steps of:
determining whether a session is being removed from the network bandwidth;
determining if a Previously Presented session is being added when a time period "T" has not expired;
determining if any encoded session is allocated with minimum bandwidth upon removal of a session;
if none, applying a Quality of Service (QoS) algorithm to all data sessions with excess bandwidth and negotiate the bit rate for the sessions with bandwidth allocation changed;
finding a voice session with the largest minimum bandwidth subscription;
determining whether some excess bandwidth remains after a pending session started;
allocating preferred bandwidth to voice sessions with minimum bandwidth; and
determining if any excess bandwidth remains.

14. The method of claim 13 further comprising the step of:
determining for the remaining excess bandwidth if any voice sessions, not including those having been considered, are allocated with minimum bandwidth.

15. The method of claim 13 further comprising the step of:
allocating preferred bandwidth in the remaining bandwidth to the voice session with minimum bandwidth.

16. The method of claim 13 further comprising the step of:
negotiating bit rates for the session with bandwidth allocation changed after applying the QoS algorithm to all sessions.

17. The method of claim 13 further comprising the step of:
allocating bandwidth when a new session is removed based on ensuring that some excess bandwidth remains after a pending session is started.

18. The method of claim 13 further comprising the step of:
determining whether a session changed within a time period "T".

19. The method of claim 13 further comprising the step of:
executing a protocol for bit rate negotiation.

20. A program medium, executable in a computer system, for redistributing excess bandwidth in a packet network upon the addition of a session, comprising:
program instruction determining whether a session is being added to the network;
program instruction determining if the session is at a preferred bandwidth;
program instruction allocating preferred bandwidth to a new session if excess bandwidth available;
program instruction negotiating bit rate for the new session with the allocated bit bandwidth;
program instruction applying a Quality of Service (QoS) algorithm to all established encoded sessions including the session, if excess bandwidth is not available; and
program instruction determining if all session bandwidth allocations are equal to or greater than their minimum bandwidth upon addition of a session.

21. The medium of claim 20 further comprising:
program instructions applying the Quality of Service (QoS) algorithm to all established sessions including non encoded sessions if all session bandwidths are not at their minimum bandwidth B.

22. The medium of claim 20 further comprising:
program instructions negotiating the bit rate for the Previously Presented session and all established sessions with the bandwidth allocation changed.

23. The medium of claim 20 further comprising:
program instructions allocating bandwidth when a new session is added based on ensuring that some excess bandwidth remains after a pending session is started.

24. A medium, executable in a computer system, for redistributing excess bandwidth in a packet network upon removal of a session, comprising:
program instructions determining whether a session is being removed from the network bandwidth;
program instructions determining if a Previously Presented session is being added when a time period "T" has not expired;
program instructions determining if any encoded session is allocated with minimum bandwidth upon removal of a session;
program instructions applying a Quality of Service (QoS) algorithm to all data sessions with excess bandwidth and negotiate the bit rate for the sessions with bandwidth allocation changed;
program instructions finding an encoded session with the largest minimum bandwidth subscription;

program instructions determining whether some excess bandwidth remains after a pending session is started.

program instructions allocating preferred bandwidth to encoded sessions with minimum bandwidth; and program instructions determining if any excess bandwidth remains.

25. The medium of claim 24 further comprising:

program instructions determining for the remaining excess bandwidth if any encoded sessions, not including those having been considered, are allocated with minimum bandwidth.

26. The medium of claim 24 further comprising:

program instructions allocating preferred bandwidth in the remaining bandwidth to the encoded session with minimum bandwidth.

27. The medium of claim 24 further comprising:

program instructions negotiating bit rates for the session with bandwidth allocation changed after applying the QoS algorithm to all sessions.

28. The medium of claim 24 further comprising the step of:

program instructions allocating bandwidth when a new session is removed based on ensuring that some excess bandwidth remains after a pending session is started.

29. The medium of claim 26 further comprising:

program instructions determining whether a session changed within a time period "T".

30. A packet network redistributing excess bandwidth for optimized performance of voice and data sessions conducted on the network, comprising:

plurality of client stations connected to the network for conducting voice and data sessions;

each client station including at least one codec for conducting sessions at a selected minimum bandwidth or a preferred bandwidth;

a Quality of Service (QoS) application executing in the client stations and controlling the redistribution of bandwidth when a new session is set up or an existing session is removed, so that every new session will have at least minimum bandwidth or, reallocating bandwidth to remaining sessions after a removal of a session to increase bandwidth for some sessions; and excess bandwidth detection apparatus for reallocating bandwidth when an existing voice or data session is removed based on ensuring that some excess bandwidth remains after a pending session is started.

31. A method of redistributing excess bandwidth in a packet network upon the addition of a session, comprising the steps of:

determining whether a session is being added to the network;

determining if the session is at a preferred bandwidth;

allocating preferred bandwidth to a new session if excess bandwidth is available;

negotiating bit rate for the new session with the allocated bit bandwidth;

applying a Quality of Service (QoS) algorithm to all established voice sessions including the new session, if excess bandwidth is not available; and determining if all session bandwidth allocations are equal to or greater than their minimum bandwidth upon addition of a session; and allocating bandwidth when a new voice or data session is added based on ensuring that some excess bandwidth remains after a pending session is started.

* * * * *